United States Patent
Shi

(10) Patent No.: US 8,094,746 B2
(45) Date of Patent: Jan. 10, 2012

(54) TRANSMISSION METHOD AND SYSTEM FOR THE DISCRETE MULTI-TONE MODULATION DATA

(75) Inventor: Qingquan Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 749 days.

(21) Appl. No.: 12/170,791

(22) Filed: Jul. 10, 2008

(65) Prior Publication Data

US 2008/0273604 A1 Nov. 6, 2008

Related U.S. Application Data

(63) Continuation of application No. PCT/CN2007/000095, filed on Jan. 10, 2007.

(30) Foreign Application Priority Data

Jan. 11, 2006 (CN) .......................... 2006 1 0000838

(51) Int. Cl.
H04L 27/00 (2006.01)

(52) U.S. Cl. .......................... 375/295; 375/259; 375/345

(58) Field of Classification Search .......... 375/259–260, 375/224, 295, 345
See application file for complete search history.

(56) References Cited

U.S. PATENT DOCUMENTS

| | | | | |
|---|---|---|---|---|
| 5,533,008 A * | 7/1996 | Grube et al. | ................... | 370/252 |
| 6,794,998 B2 * | 9/2004 | Chen | ................. | 341/59 |
| 7,088,781 B2 * | 8/2006 | Betts | ............................. | 375/260 |
| 7,496,134 B2 * | 2/2009 | Redfern et al. | ............... | 375/222 |
| 2001/0031011 A1 | 10/2001 | Betts | | |
| 2002/0181609 A1 * | 12/2002 | Tzannes | ........................ | 375/295 |
| 2005/0046582 A1 | 3/2005 | Kessel et al. | | |
| 2005/0046592 A1 | 3/2005 | Cooper et al. | | |
| 2006/0004945 A1 * | 1/2006 | Kahlman | ...................... | 711/100 |
| 2010/0329317 A1 * | 12/2010 | Tzannes | ........................ | 375/222 |
| 2011/0019751 A1 * | 1/2011 | Tzannes et al. | ............... | 375/259 |

OTHER PUBLICATIONS $1^{st}$ Office Action in corresponding Chinese Application No. 200610000838.6 (Apr. 3, 2009).
Written Opinion of the International Searching Authority in corresponding PCT Application No. PCT/CN2007/000095 (Apr. 26, 2007).

* cited by examiner

*Primary Examiner* — Jean B Corrielus
(74) *Attorney, Agent, or Firm* — Leydig, Voit & Mayer, Ltd.

(57) ABSTRACT

A transmission method and system of the discrete multi-tone modulation data, the method includes: generating, at a transmitting side, a first bit table according to data to be transmitted, wherein items of the first bit table include carrying data information on each line during this data transmission; modulating and transmitting, at the transmitting side, the data according to the first bit table to a receiving side; and demodulating, at the receiving side, the received data according to the first bit table to obtain corresponding data. With the transmission method and system for discrete multi-tone modulation data provided in embodiments of the present invention, the line rate and the transmission power on lines can be dynamically and timely adjusted according to information ratio of the line transmission, by using a dynamic bit table (BIT table) to carry variable information on the data carried by lines, thereby saving power resource.

15 Claims, 7 Drawing Sheets

| TONE | 0 | 1 | 2 | 3 | 2 | 1 | 2 | 1 | 0 | 2 | 0 | 2 | 1 | 1 | 3 | 3 | 3 | 2 | 1 | 0 | 2 | 3 | 2 |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

| TONE | 0 | 0 | 0 | 0 | 1 | 1 | 1 | 1 | 1 | 1 | 2 | 2 | 2 | 2 | 2 | 2 | 2 | 3 | 3 | 3 | 3 | 3 |
|---|---|---|---|---|---|---|---|---|---|---|---|---|---|---|---|---|---|---|---|---|---|---|
| | 1 | 9 | 11 | 20 | 19 | 14 | 13 | 8 | 6 | 2 | 23 | 21 | 18 | 12 | 10 | 7 | 5 | 3 | 17 | 4 | 15 | 16 | 22 |

| TONE | 2 | 3 | 3 | 3 | 3 | 3 |
|---|---|---|---|---|---|---|
| | 3 | 17 | 4 | 15 | 16 | 22 |

TRANSMISSION METHOD AND SYSTEM FOR THE DISCRETE MULTI-TONE MODULATION DATA

CROSS-REFERENCE TO RELATED APPLICATIONS

This application is a continuation of International Patent Application No. PCT/CN2007/000095, filed Jan. 10, 2007, which claims priority to Chinese Patent Application No. 200610000838.6, filed Jan. 11, 2006, both of which are hereby incorporated by reference in their entirety.

FIELD OF THE INVENTION

The present invention relates to communication field, and more particularly, to a transmission method and system for discrete multi-tone modulation data.

BACKGROUND xDSL is a high speed data transmission technology for transmission over telephone twist pair (Unshielded Twist Pair, UTP). In addition to digital subscriber line (DSL) of baseband transmission such as IDSL and SHDSL, xDSL of passband transmission enables xDSL and traditional telephone service (POTS) to coexist in a same twisted pair by using frequency-division multiplexing technology. The xDSL occupies high band and the POTS occupies baseband below 4 KHz, POTS signal and xDSL signal are separated by a splitter. The xDSL of passband transmission uses discrete multi-tone modulation (DMT). A system providing multiplex xDSL access is referred to as a DSL access multiplexer (DSLAM), and a system reference model thereof is shown in FIG. 1.

A rate, for example, a line rate of downlink 2M, is determined when xDSL is on; or a line rate, for example, 4M, is determined according to a line status during training the xDSL transceiver. Once the rate is determined, the line rate keeps constant during practical operation, regardless of the rate of service data flow, which will be inflexible when bit error rate needs to be lowered.

Technically, in order to maintain constant line rate, the transmission power on line should not vary all the time. For example, the line rate and total transmission power that are determined during line training are $R_0$ and $P_0$ respectively. Assume that the information that can be transmitted when a line rate is sufficiently used is $I_0$, then $$IPR = \frac{I_0}{P_0}$$

is the information power ratio of the line transmission. However, in case of a line rate of $R_0$, the information transmitted I is less than $I_0$, i.e., $I<I_0$, because the total signal transmission power $P_0$ needs to be kept constant in order to maintain the line rate $R_0$. In this case, $$IPR = \frac{I}{P_0}$$

will be small. In other words, less information is transmitted with the same power, which results in a waste of supply power.

SUMMARY

Embodiments of the present invention provide a transmission method and system for discrete multi-tone modulation data to solve the problem of wasting power resource in prior art due to the fact that the initial line rate keeps constant during transmission of discrete multi-tone modulation data.

A transmission method for discrete multi-tone modulation data includes: generating, at a transmitting side, a first bit table according to data to be transmitted, items of the first bit table including carrying data information on each line during this data transmission; modulating and transmitting, at the transmitting side, the data according to the first bit table to a receiving side; and demodulating, at the receiving side, the received data according to the first bit table to obtain corresponding data.

A transmission system for discrete multi-tone modulation data includes a transmitting side and a receiving side.

The transmitting side includes an initial bit table unit, an encoding unit and a transmitting unit, in which the encoding unit encodes data according to information in the initial bit table unit, and the transmitting unit transmits the encoded data to the receiving side.

The receiving side includes a receiving unit, a decoding unit and an initial bit table unit, in which the receiving unit receives data, and the decoding unit decodes the received data according to information in the initial bit table unit to obtain corresponding data.

The transmitting side further includes: a line rate determining solution unit adapted to determine a line rate solution for carrying data to be transmitted; and a transmitting side first bit table unit connected to the line rate solution determining unit, adapted to dynamically generate a first bit table according to rate information required for the transmission of the data to be transmitted, in which the encoding unit encodes the data according to the information in the first bit table unit, and the transmitting unit transmits the encoded data to the receiving side.

The receiving side further includes: a receiving side first bit table unit adapted to dynamically generate a first bit table according to rate information for receiving data. After the receiving unit receives the data, the decoding unit decodes the received data according to the information in the first bit table unit to obtain corresponding data.

The embodiments of the present invention have at least the following beneficial effects: with the transmission method and system for discrete multi-tone modulation data provided in embodiments of the present invention, the line rate and the transmission power on lines can be dynamically and timely adjusted according to information ratio of the line transmission, by using a dynamic bit table (BIT table) to carry variable information on the data carried by lines, thereby saving power resource.

BRIEF DESCRIPTION OF THE DRAWING(S)

DETAILED DESCRIPTION

Embodiments of the present invention are described as follows by reference to the accompany drawings.

In an embodiment of the present invention, a dynamic BIT table is generated at the transmitting side according to the amount of data to be transmitted, for carrying data on the line, and the amount of information carried by the line is adjusted instantly at the transmitting side while data is being transmitted, thereby saving power resource.

A BIT table is a bit assignment table. DMT (OFDM (Orthogonal frequency division multiplexing)) divides the whole frequency band of a line into several sub-frequency bands (which are also referred to as TONEs), each of which is orthogonal to each other. These sub-frequency bands are used to communicate information with existing digital modulation techniques (especially, QAM modulation technique for xDSL). In the modulation techniques, the amount (especially, how many bits) of information to be carried is required to be determined according to noise of each tone and power to be transmitted, and thus bit table and gain table are generated from the amount of information.

The whole process of generating bit table and gain table is implemented by xDSL nest plate. These two tables are critical table items for DMT modulation and demodulation technique, and are stored in xDSL nest plate all the time. In general, existing products will not change these two values at a venture, because implementation details of the entire physical (PHY) layer should be adjusted accordingly, upon these two values are changed.

Figure 1:
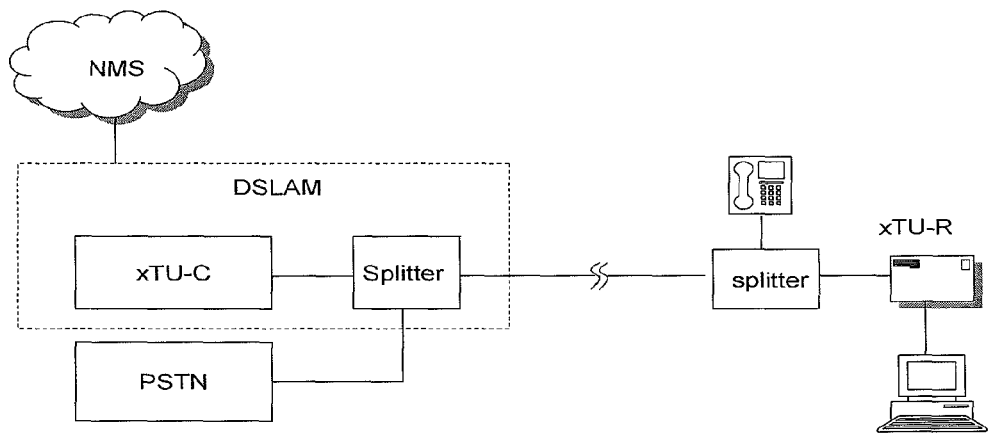
FIG. 1 is a reference structure schematic diagram of a xDSL system.
Figure 2:
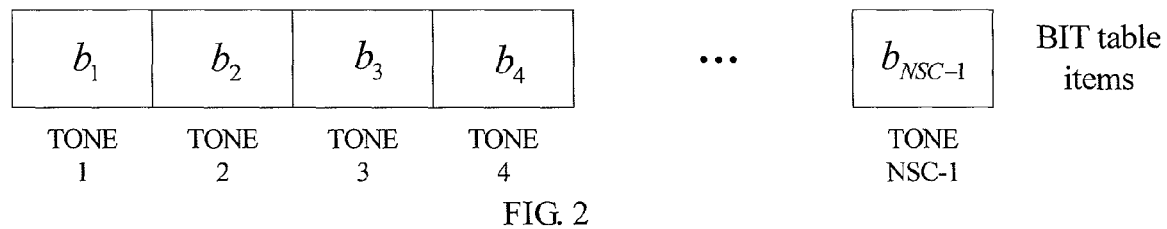
FIG. 2 is a schematic diagram showing a bit table.

FIG. 2 shows a diagram of a bit table. As shown in FIG. 2, the bit table includes NSC-1 items, each of which corresponds to a piece of carrying bit information.

Figure 3:
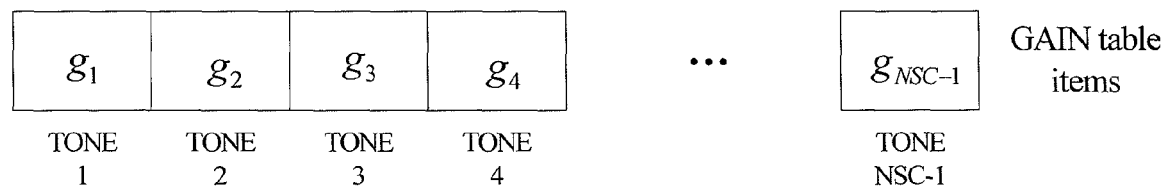
FIG. 3 is a schematic diagram showing a GAIN table.

FIG. 3 shows a diagram of a gain table corresponding to the bit table of FIG. 2. As shown in FIG. 3, the gain table includes NSC-1 items, each of which corresponds to one piece of gain adjustment information.

The bit table items and gain table items conform to relevant standard provisions of ITU-T (G.993.2). In fact, each TONE transmits substantially identical power ($P_t$), regardless of the number of carrying bits. That is, the information power ration IPR $$\frac{b_i}{(P_t)}$$

of each tone varies. The smaller the $b_i$, the smaller the IPR. Therefore, tones with low bit carrying ratio should be reduced or closed first, if the actual data rate is lower than the line rate.

Figure 4:
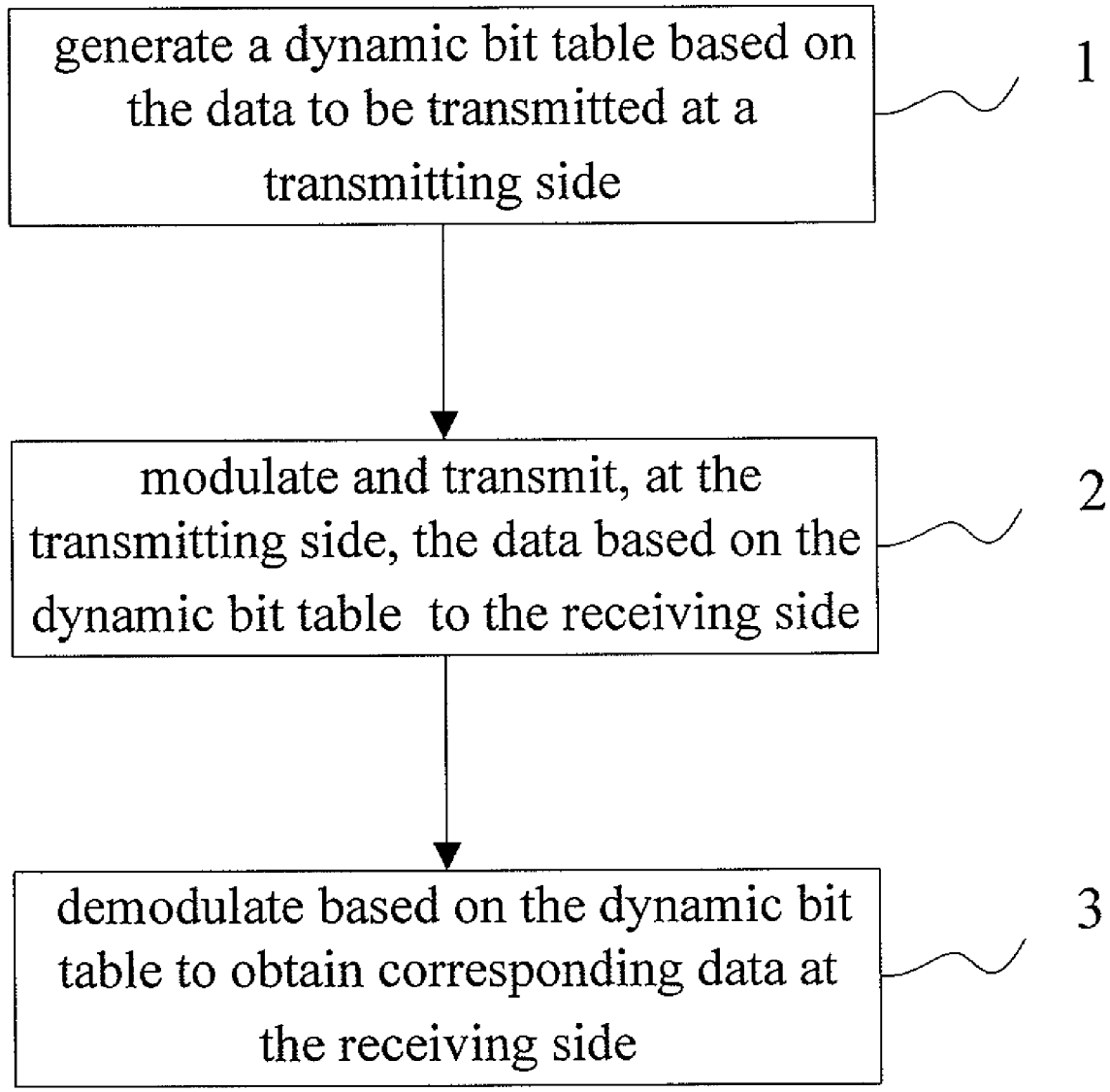
FIG. 4 is a main flowchart of an embodiment of the present invention.

FIG. 4 shows a main flow of an embodiment according to the present invention. As shown in FIG. 4, the flow mainly includes the following steps.

At step 1, at a transmitting side, a dynamic bit table is generated according to data to be transmitted, items of the dynamic bit table including amount of the information to be carried by each sub-frequency band (TONE) during this data transmission.

The dynamic bit table is determined at the transmitting side according to the line rate for data information to be transmitted, and items of the table are information amount to be carried by each line during this data transmission. The above information may be different from that of initial bit table items. With such adjustment, it is possible for the transmitting side to configure amount of the information to be carried by each sub-frequency band (TONE) during this data transmission in a flexible and appropriate manner, for the purpose of saving power resource.

For convenience, the line rate solution may be described with a differential method. In this way, for each time of determining a line rate and adjusting bit table item, the line rate solution can be obtained quickly and directly according to difference.

At step 2, at the transmitting side, the data is modulated and transmitted to the receiving side, according to the dynamic bit table.

After the dynamic bit table is determined, the data to be transmitted is modulated and transmitted at the transmitting side, according to the dynamic bit table items.

At step 3, the received data is demodulated at the receiving side according to the dynamic bit table to obtain corresponding demodulated data.

After receiving data from the transmitting side, a corresponding demodulation is executed at the receiving side according to the dynamic bit table items to obtain corresponding demodulated data content.

In the above procedure, a dynamic gain table can also be dynamically generated at the transmitting side. The dynamic gain table corresponds to the dynamic bit table and includes gain adjustment amount for each line during this data transmission.

Accordingly, at step 2 and step 3, modulation, transmission and demodulation are carried out respectively by reference to this gain table to obtain corresponding data.

In the above solution, it is required to ensure that the contents of dynamic bit table and dynamic gain table used by the transmitting side when modulating data are consistent completely. Otherwise, errors may occur. As a method for ensuring the coincidence therebetween, it can be implemented by transmitting the line rate solution for this data transmission from the transmitting side to the receiving side upon an independent data channel, and acquiring, by approaches such as computing at the receiving side, the dynamic bit table and dynamic gain table with the line rate solution.

The above solution may also involve an issue of automatic gain control at the receiving side. In the embodiments of the present invention, a piece of fixed dynamic line carrying information may be set in the dynamic bit table, which keeps constant and makes no adjustment. An automatic gain control is executed at the receiving side according to the dynamic line carrying information.

Figure 5:
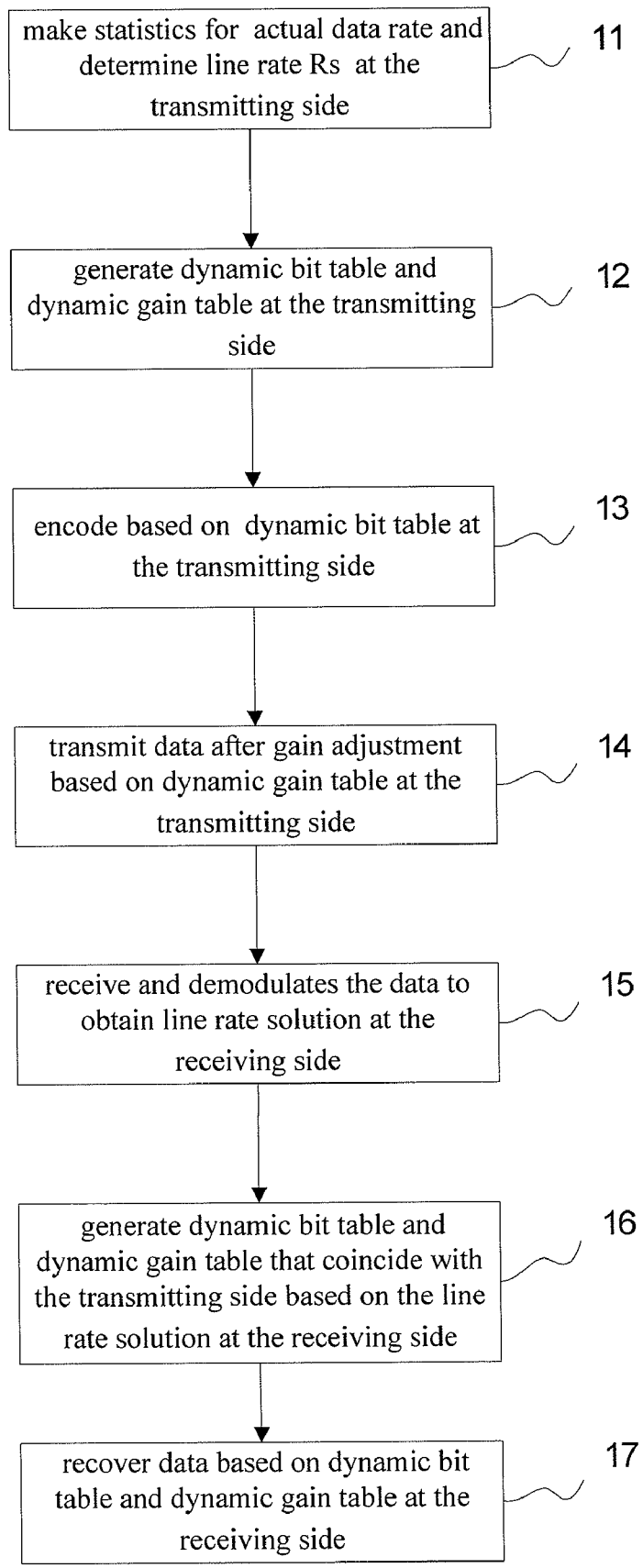
FIG. 5 is a flowchart of an embodiment of the present invention.

A specific application of transmission of discrete multi-modulated data is described in the following. In this transmission procedure, contents such as code modulation are added. FIG. 5 shows a flowchart, in which, the flow mainly includes the following steps:

At step 11, at a transmitting side, a statistics of actual data rates is made and a line rate $R_s$ is determined according to the statistics.

In this step, $R_s$ is required to be equal to or smaller than the initial line rate $R_0$.

At step 12, at the transmitting side, a line rate solution is determined according to the line rate $R_s$, and dynamic bit table ($BIT_{new}$) and dynamic gain table ($GAIN_{new}$) are generated.

At step 13, the data is encoded at the transmitting side, according to the dynamic bit table ($GAIN_{new}$).

The process of encoding data can be carried out according to encoding schemes.

At step 14, at the transmitting side, the gain is adjusted according to the dynamic gain table ($GAIN_{new}$) according to step 13 in combination with information on a line rate, and data is transmitted after passing through functional modules such as FFT.

At step 15, at the receiving side, the transmitted data is received, and the received data is equalized, A/D converted, and FFT transformed to obtain the line rate solution.

At step 16, at the receiving side, a dynamic bit table ($BIT_{new}$) and a dynamic gain table ($GAIN_{new}$) that coincide with that of the transmitting side are generated according to the line rate solution.

With the line rate solution, a dynamic bit table ($BIT_{new}$) and a dynamic gain table ($GAIN_{new}$) that coincide with that of transmitting side may be generated at the receiving side to ensure that the received data may be accurately demodulated at the receiving side.

At step 17, the data is recovered at the receiving side according to relevant standards, according to the dynamic bit table ($BIT_{new}$) and the dynamic gain table ($GAIN_{new}$).

In the above embodiment, technical points may be treated as follows:

1. Line Rate Solution

The line rate solution employs differential manner and the difference is represented with two bits as shown in Table 1:

TABLE 1

| Difference | 00 | 01 | 10 | 11 |
|---|---|---|---|---|
| Meaning | constant | Subtracting Δ | Adding Δ | returning |

In table 1, $R_{min}$ is the lowest line transmission rate; $R_{max}$ is the highest line transmission rate that is equal to the rate determined during line initialization. The difference may be determined according to statistic values. The unit of the difference is bit.

In table 1, the selection of a magnitude of difference is associated with following characteristic of line output rate after adjustment. If the difference is large, the following characteristic is good. However, large variation of analog signal on the line may cause the transmission on the line instable.

Table 1 is used as follows:

In case that the existing line rate is determined to be constant through information statistics, the difference will be 00. The line rate of the last time is maintained.

In case that the existing line rate is determined to be lower than that of the last time through information statistics, the difference will be 01. The line rate is lowered by one Δ. If the line rate is already lowered to $R_{min}$, the line rate will be $R_{min}$.

In case that the existing line rate is determined to be higher than that of the last time through information statistics, the difference will be 10. The line rate is increased by one Δ. If the line rate is already increased to $R_{max}$, the line rate will be $R_{max}$.

In case that the existing line rate is determined to be much higher than that of the last time through information statistics, the difference will be 11. The line rate returns to $R_{max}$ directly.

2. Synchronization Solution for Dynamic Bit Tables at the Receiving Side and the Transmitting Side.

After line initialization, an initial bit table is generated and a line rate is determined according to the initial table. When the initial bit table is changed, the line rate changes accordingly. However, the changes of bit tables at both of the transmitting and receiving sides must be synchronous. Otherwise, a transmission error will occur.

In order to achieve the synchronization, in embodiments of the present invention, the line rate solution may be transmitted to the receiving side through specific TONEs that are generally selected to be the TONEs with more carrying bits.

A part of the special TONEs may be used to transmit control information for implementing embodiments of the present invention and the other part thereof are used to transmit data and these TONEs may be constant.

3. Ordering for Items of Dynamic Bit Table.

Figures 6, 7, 8, 9:
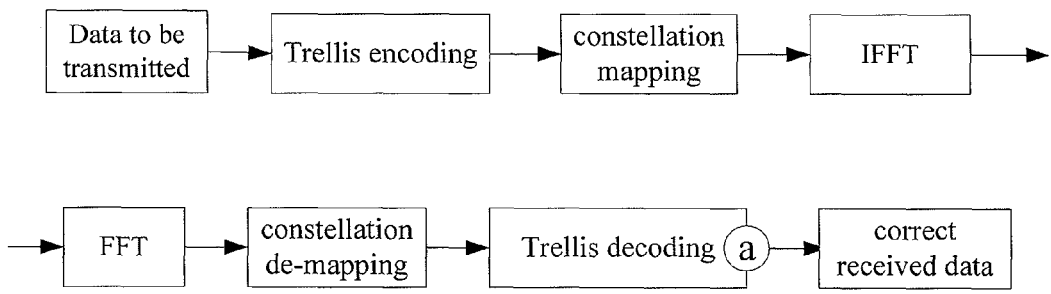
FIG. 6 is a schematic diagram of items of initial bit table determined when lines are initialized, according to an embodiment of the present invention.
FIG. 7 is a schematic diagram of items of dynamical bit table after ordering, according to an embodiment of the present invention.
FIG. 8 is an ordering diagram after the line rate is determined according to an embodiment of the present invention.
FIG. 9 is a schematic diagram of data transmission.

FIGS. 6 and 7 show examples of ordering of bit table items (NSC=24, special TONE of 4\15\16\22). FIG. 6 shows items of the initial bit table determined during line initialization (hereinafter initial bit table items), while FIG. 7 shows items of a dynamic bit table after ordering.

The ordering may be implemented according to the following rules: the TONEs are arranged in an order from left to right according to the carried data amount thereof; the TONEs is arranged from big TONE to small TONE in the case that the carried data amount thereof is same; the ordering of TONEs with carrying data amount of 0 is not required; the special TONEs determined as above being arranged at the last position of the table with no special requirements for its order.

The dynamic bit table for $R_{min}$ is determined. As shown in FIG. 8, rules for determining the dynamic bit table for $R_{min}$ are as follows: extracting some items including at least all special TONEs from right to left at the rightmost side of the ordered dynamic bit table items.

4. Adjusting of Initial Bit Table Items According to Differences.

A differential granularity refers to the number of adjusted bits in initial bit table items and is represented as Δ in the following. In the embodiments of the present invention, Δ may take any one integer of 1 to 15, and the values of Δ at both of the transmitting and receiving sides are required to be consistent each other. For each time the bit table items are changed, only one TONE may be changed so as to facilitate synchronous operation of the transmitting and receiving sides.

(1) Difference of 00:

The initial bit table items are unchanged.

(2) Difference of 01:

First, it is determined whether the existing dynamic bit table items are consistent with the initial bit table items corresponding to $R_{min}$. If the existing dynamic bit table items are consistent with the initial bit table items, the dynamic bit table items need no adjustment. If the existing dynamic bit table items are inconsistent with the initial bit table items, assuming the leftmost non-zero item of the dynamic bit table is $B_z$, the corresponding values of the dynamic bit table items will be $$B_n = \begin{cases} B_z - \Delta & B_z > \Delta \\ 0 & B_z \leq \Delta. \end{cases}$$

(3) Difference of 10:

First, it is determined whether the dynamic bit table items are consistent with the initial bit table items. If the dynamic bit table items are consistent with the initial bit table items, the dynamic bit table items need no adjustment. If the dynamic bit table items are inconsistent with the initial bit table items, assuming that the rightmost unequal item of the dynamic bit table while comparing with the initial bit table is $B_y$, and the corresponding item of the initial bit table is $B_o$, then the values corresponding to the dynamic bit table items are $$B_n = \begin{cases} B_o & B_y + \Delta \geq B_o \\ B_y + \Delta & B_y + \Delta < B_o. \end{cases}$$

(4) Difference of 11:

The initially ordered original bit table items are used as the dynamic bit table items, regardless of the state of the current dynamic bit table items.

5. Transmission of the Line Rate Solution:

Because the initial bit table items at both sides are consistent, when dynamic bit table items at both sides are required to adjust synchronously, it can be achieved as long as the difference is correctly transmitted.

In general, as shown in FIG. 9, the transmission can be completed at the transmitting side in the following order:

performing Trellis encoding on the data to be transmitted according to initial bit table;

performing constellation mapping on the encoded data; and transmitting the mapped data to the receiving side via IFFT module, D/A conversion module and drive;

The data is received in the following order at the receiving side:

receiving data via amplification, A/D and IFFT module;

performing constellation de-mapping on the received data; and executing trellis decoding on the de-mapped data according to the initial bit table to obtain correct received data.

Figure 10:
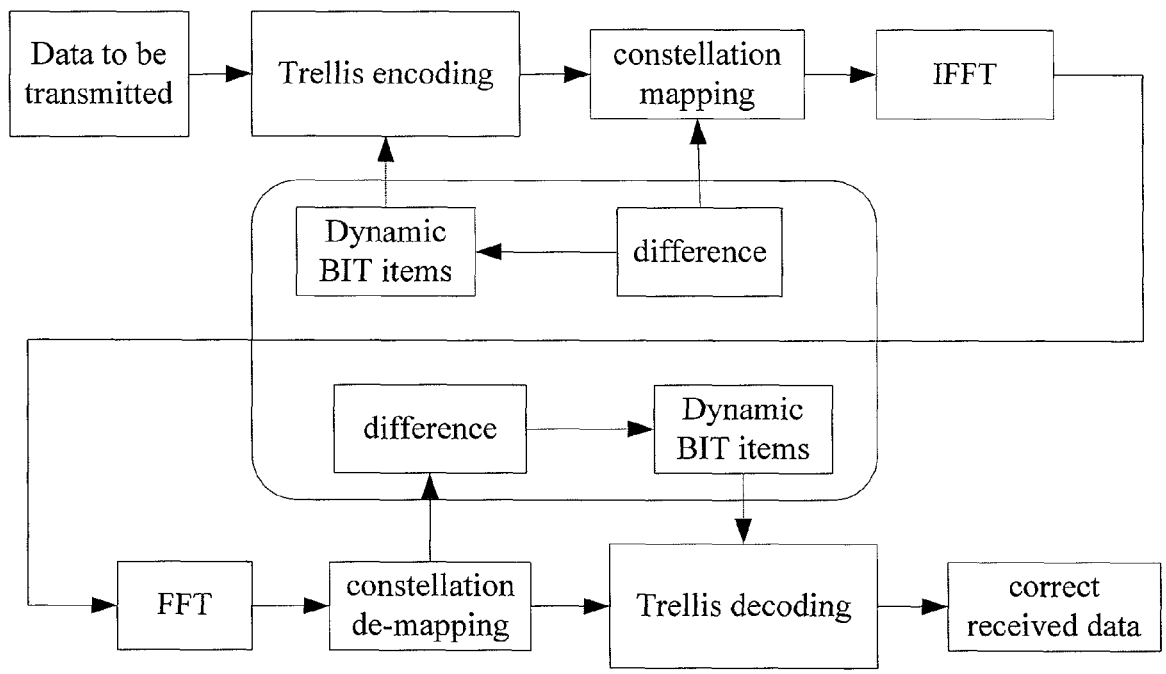
FIG. 10 is a schematic diagram of data transmission according to an embodiment of the present invention.

As can be seen from FIG. 9, if the TONE for transmitting difference is subjected to Trellis encoding, updated dynamic bit table items can not be obtained while performing Trellis decoding according to the initial bit table as shown in FIG. 9. As a result, an error will occur in the entire result. The transmission of difference should be carried out according to the modular manner in FIG. 10, which specifically includes:

at the transmitting side:

performing Trellis encoding on the data to be transmitted according to the dynamic bit table;

performing constellation mapping on the encoded data and difference; and transmitting the mapped data to the receiving side via IFFT module, D/A conversion module and drive;

at the receiving side:

receiving data via amplification, A/D conversion and IFFT module;

performing constellation de-mapping on the received data to obtain difference, and obtaining the dynamic bit table according to the difference;

executing Trellis decoding on the de-mapped data according to the dynamic bit table to obtain correct received data.

The above difference may be transmitted on either pilot frequency or specified other TONEs, while the transmitting and receiving sides must synchronize transmission of difference by using certain mechanism as determined in initialization process.

6. Automatic Gain Control (AGC).

The transmission power in existing xDSL keeps constant upon determined during initialization. The AGC technology based on this condition can not satisfy requirements of the above transmission power that is rapidly varied with data rate. Therefore, the following solution is adopted so as to achieved the above problems:

The whole frequency band for the transmission by the transceiver is divided into 1 segments ($l \in (3,4,5,6,7,8)$). For each segment, the TONE with most carrying bits in the initial bit table items is used as the special TONE. In case of several TONEs with the same number of carrying bits, the TONE close to central point may be selected among the several TONES as the special TONE. The TONE for Polit may be used as the special TONE of AGC.

Only these special TONEs are used for AGC at the receiving side. As described above, once these TONEs are determined, their corresponding initial bit table items and initial gain table items can not be changed.

7. Generating Dynamic Gain Table Items According to Dynamic Bit Table Items.

When the dynamic bit table items are adjusted according to the above solution, the dynamic gain table items corresponding to the dynamic bit table items should be adjusted accordingly. The adjustment rules are as follows:

if $B_n=0$ after adjustment, then $G_n=0$ accordingly.

if $B_n \neq 0$ after adjustment, then $$G_n = \begin{cases} G_o - 3(B_n - B_o) & \text{if } G_o - 3(B_n - B_o) \geq B_{min} \\ B_{min} & \text{if } G_o - 3(B_n - B_o) < B_{min} \end{cases}$$

accordingly, where $G_{min}$ is the maximum, minimum gain values specified in relevant standards; and $G_o$ is the initial gain table value.

Figure 11:
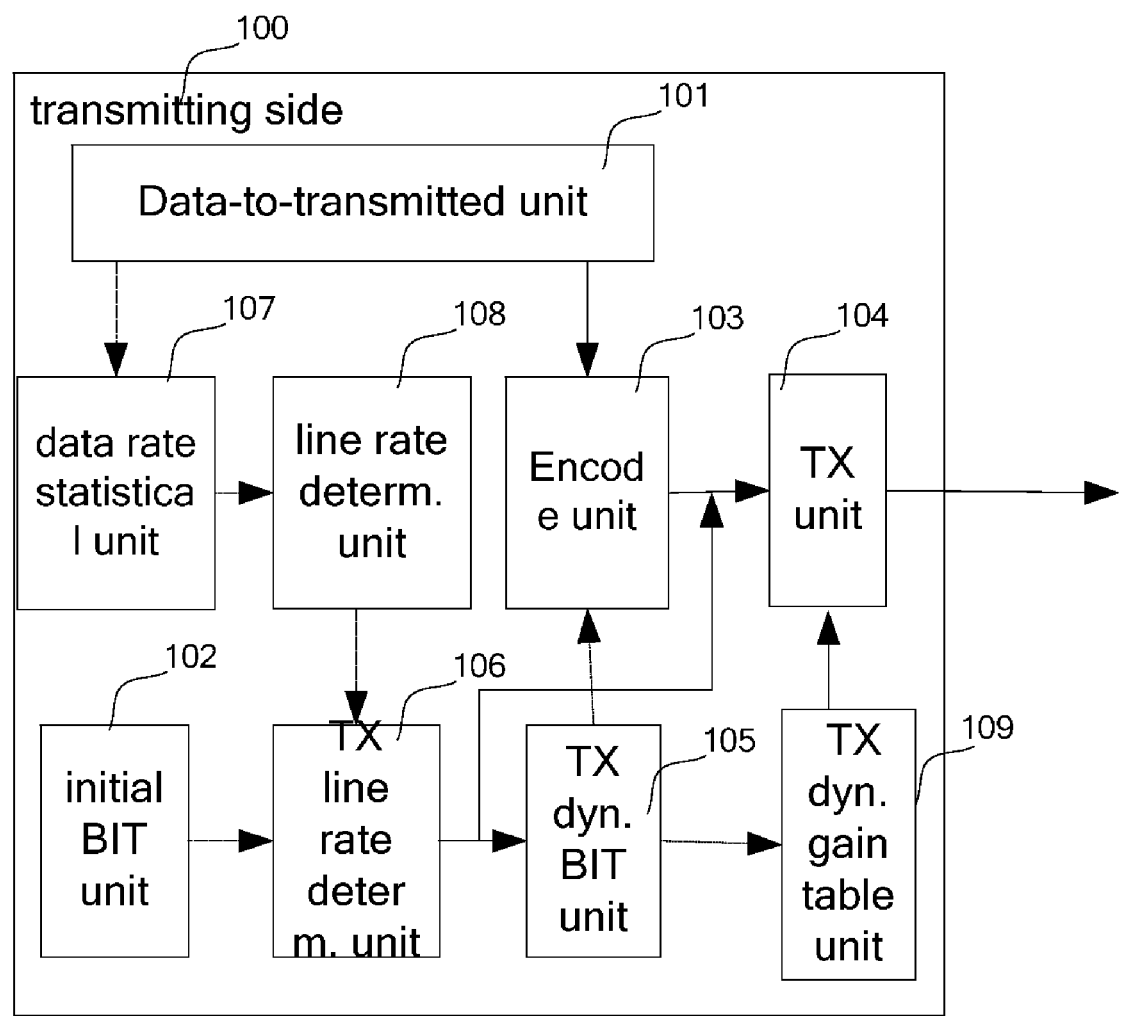
FIG. 11 is a structure schematic diagram of a transmitting side of an embodiment of a transmission system for discrete multi-tone modulation data according to the present invention.
Figure 12:
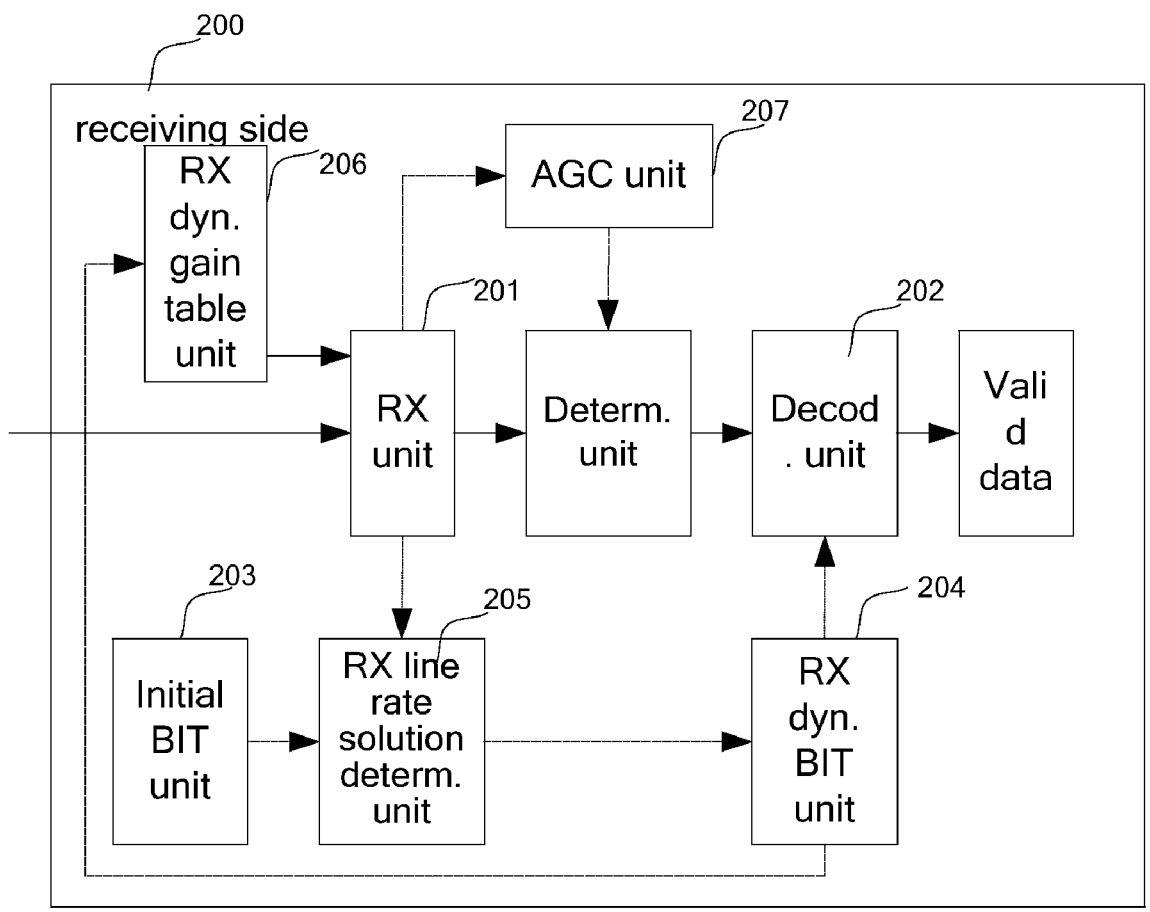
FIG. 12 is a structure diagram of a receiving side of an embodiment of a transmission system for discrete multi-tone modulation data according to the present invention.

As shown in FIGS. 11 and 12, the transmission system for discrete multi-modulated data according to an embodiment of the present invention includes a transmitting side 100 and a receiving side 200.

As shown in FIG. 11, the transmitting side includes a data-to-transmitted unit 101, an initial bit table unit 102, an encoding unit 103 and a transmitting unit 104. The encoding unit 103 encodes the data according to the initial bit table information after receiving the data to be transmitted, and the encoded data is transmitted to the receiving side 200 via the transmitting unit 104.

As shown in FIG. 12, the receiving side 200 includes a receiving unit 201, a decoding unit 202 and an initial bit table unit 203. After the receiving unit 201 receives data transmitted from the transmitting side 100, the decoding unit 202 decodes the received data according to the information in the initial bit table unit 203 to obtain corresponding data.

In embodiments of the present invention, according to the above solution. A transmitting side dynamic bit table unit 105 and a receiving side dynamic bit table unit 204 adapted to dynamically adjust bit table items information may be further added at the transmitting side 100 and the receiving side 200, respectively. The details are as follows.

The transmitting side 100 is further provided with: a transmitting side line rate solution determining unit 106 adapted to determine a line rate solution for carrying data to be transmitted; and a transmitting side dynamic bit table unit 105 connected to the transmitting side line rate solution determining unit 106, adapted to generate a dynamic bit table according to the determined line rate solution for carrying data to be transmitted.

After adding the above two units, the encoding unit 103 encodes the data according to the dynamic bit information in the transmitting side dynamic bit table unit 105, and the transmitting unit 104 transmits the encoded data to the receiving side 200.

The receiving side 200 is further provided with a receiving side dynamic bit table unit 204 adapted to generate dynamic bit tables according to the rate information for receiving data.

After adding the above unit, after the receiving unit 201 receives data, the decoding unit 202 decodes the received data according to the information in the dynamic bit table unit 204 to obtain corresponding data.

In the embodiments of the present invention, the transmitting side is further provided with: a data rate statistical unit 107 adapted to execute statistics for rate information transmitted from the transmitting side; a line rate determining unit 108 adapted to determine a line rate according to the statistics of the data rate statistical unit 107; and a transmitting side dynamic gain table unit 109 adapted to dynamically generate a dynamic gain table according to the transmitting side dynamic bit table unit 105.

Corresponding to the above arrangement of the transmitting side 100, the receiving side 200 is further provided with: a receiving side line rate solution determining unit 205 adapted to determine a rate required for receiving data; and a receiving side dynamic gain table unit 206 adapted to dynamically generate a dynamic gain table according to the receiving side dynamic bit table unit 204.

To facilitate the receiving side's gain control, an automatic gain control unit 207 is also provided at the receiving side in the embodiments of the present invention for automatic gain control.

With the data transmission method and system with constant IPR of transmission line and DMT modulation provided in the above embodiments, the line rate and the transmission power on lines can be dynamically and timely adjusted according to information ratio of the line transmission, by using a dynamic bit table (BIT table) to carry variable information on the data carried by lines, thereby saving power resource. At the same time, data transmitted by the line is decreased, crosstalk between lines is reduced, and therefore the transmission bit error rate is decreased.

In the above embodiments of the present invention, bit tables and gain tables are changed as required, which causes the transmitting and receiving sides to be in an IPR optimized state all the time. Adjustment is made timely according to dynamic bit tables and gain tables information, and thus the problem of wasting power resource can be solved. At the same time, the crosstalk between lines of the same buddle can be lowered. Thus, the rapid synchronous update of bit and gain tables at the transmitting and receiving sides can be achieved technically.

Obviously, a person skilled in the art may make various changes and modifications to the present invention without departing from the spirit and scope of the present invention. The present invention is thus intended to include these changes and modifications if they are within the scope of the claims and their equivalents.

What is claimed is:

1. A transmission method for discrete multi-tone modulation data, comprising:
    A. generating, at a transmitting side, a first bit table according to data to be transmitted, wherein items of the first bit table include information of data carried on each line during this data transmission; and wherein the first bit table is determined according to a line rate solution for this data information at the transmitting side;
    B. modulating and transmitting, at the transmitting side, the data according to the first bit table to a receiving side;
    C. acquiring the first bit table information at the receiving side, wherein the first bit table information acquired at the receiving side is obtained according to initial bit table information, and
    demodulating, at the receiving side, the received data according to the acquired first bit table to obtain corresponding data.

2. The method of claim 1, wherein, the line rate solution is determined in a differential manner.

3. The method of claim 1, wherein, the step A further comprises:
    transmitting, at the transmitting side, the line rate solution for this data information transmission to the receiving side via a first data channel; and
    acquiring the first bit table with the line rate solution at the receiving side.

4. The method of claim 1, wherein,
    the step A further comprises generating a first gain table, wherein items of the first gain table correspond to items of the first bit table and comprise a respective gain adjustment amount for each line during this data transmission;
    the step B further comprises adjusting gain according to the first gain table at the transmitting side; and
    the step C further comprises demodulating the data according to the first gain table at the receiving side.

5. The method of claim 1, wherein,
    in the step A, the first bit table further comprises information of data carried on a first line; and
    in the step C, an automatic gain control is executed according to the information of the data carried on the first line.

6. The method of claim 5, wherein, the information of the data carried on the first line is constant.

7. A transmission system for discrete multi-tone modulation data, comprising a transmitting side and a receiving side,
    the transmitting side comprising a first initial bit table unit, an encoding unit and a transmitting unit, wherein the encoding unit encodes data according to information in the first initial bit table unit, and the transmitting unit transmits the encoded data to the receiving side;
    the receiving side comprising a receiving unit, a decoding unit and an second initial bit table unit, wherein the receiving unit receives the transmitted data, and the decoding unit decodes the received data according to information in the second initial bit table unit to obtain corresponding data;
    the transmitting side further comprising:
    a transmitting side line rate solution determining unit connected to the first initial bit table unit, and adapted to determine a line rate solution for carrying data to be transmitted;
    a transmitting side first bit table unit connected to the transmitting side line rate solution determining unit, and adapted to dynamically generate a first bit table according to rate information required for the data to be transmitted;

wherein the encoding unit encodes the data according to the information in the transmitting side first bit table unit and the transmitting unit transmits the encoded data to the receiving side; and the receiving side further comprising:
a receiving side line rate solution determining unit connected to the second initial bit table unit, and adapted to determine a rate required for receiving data,
a receiving side first bit table unit connected to the receiving side line rate solution determining unit, and adapted to dynamically generate a receiving side first bit table according to rate information for receiving data;

wherein, after the receiving unit receives the transmitted data, the decoding unit decodes the received data according to the receiving side first bit table generated by the receiving side first bit table unit to obtain corresponding data.

8. The system of claim 7, wherein, the transmitting side further comprises:
a data rate statistical unit, adapted to execute statistics for rate information transmitted from the transmitting side; and
a line rate determining unit connected to the line rate solution determining unit and to the data rate statistical unit, adapted to determine a line rate.

9. The system of claim 7, wherein,
the transmitting side further comprises:
a transmitting side first gain table unit adapted to dynamically generate a first gain table for adjusting transmission power at the transmitting side, according to the transmitting side first bit table generated by the transmitting side first bit table unit; and
the receiving side further comprises:
a receiving side first gain table unit adapted to dynamically generate a first gain table for adjusting receiving power at the receiving side, according to the receiving side first bit table generated by the receiving side first bit table unit.

10. The system of claim 7, wherein, the receiving side further comprises: an automatic gain control unit connected to the receiving unit adapted to execute an automatic gain control.

11. A transmitting device for transmitting discrete multi-tone modulation data, comprising an initial bit table unit, an encoding unit and a transmitting unit, wherein the encoding unit encodes data according to information in the initial bit table unit, and the transmitting unit transmits the encoded data to a receiving side;

the transmitting device further comprising:
a transmitting side line rate solution determining unit connected to the initial bit table unit, and adapted to determine a line rate solution for carrying data to be transmitted;
a transmitting side first bit table unit connected to the transmitting side line rate solution determining unit, adapted to dynamically generate a first bit table according to rate information required for the data to be transmitted;

wherein the encoding unit encodes the data according to the information in the first bit table unit and the transmitting unit transmits the encoded data to the receiving side.

12. A transmission method for discrete multi-tone modulation data, comprising:
A. generating, at a transmitting side, a first bit table according to data to be transmitted, wherein items of the first bit table include information of the data carried on each line during this data transmission; and wherein the first bit table is determined according to a line rate solution for this data information at the transmitting side;
transmitting, at the transmitting side, the line rate solution for this data information transmission to the receiving side via a first data channel;
B. modulating and transmitting, at the transmitting side, the data according to the first bit table to a receiving side;
C. acquiring the first bit table with the line rate solution at the receiving side, and
demodulating, at the receiving side, the received data according to the first bit table acquired to obtain corresponding data.

13. The method of claim 12, wherein,
the step A further comprises generating a first gain table, wherein items of the first gain table correspond to items of the first bit table and comprise a respective gain adjustment amount for each line during this data transmission;
the step B further comprises adjusting gain according to the first gain table at the transmitting side; and
the step C further comprises demodulating the data according to the first gain table at the receiving side.

14. The method of claim 12, wherein,
in the step A, the first bit table further comprises information of data carried on a first line; and
in the step C, an automatic gain control is executed according to the information of the data carried on the first line.

15. The method of claim 14, wherein the information of the data carried on the first line is constant.

* * * * *